United States Patent Office 3,003,003
Patented Oct. 3, 1961

3,003,003
MANUFACTURE OF 1 CHLORO-2,2,2,
TRIFLUORO-ETHANE
Robert Leslie McGinty, Widnes, England, assignor to Imperial Chemical Industries Limited, London, England, a corporation of Great Britain
No Drawing. Filed Apr. 22, 1959, Ser. No. 807,981
Claims priority, application Great Britain May 7, 1958
8 Claims. (Cl. 260—653.6)

This invention relates to an improved process for the manufacture of 1-chloro-2:2:2-trifluoroethane.

In Industrial and Engineering Chemistry 1947, 39, p. 411 it is disclosed that 1-chloro-2:2:2-trifluoroethane may be obtained by reacting hydrogen fluoride and trichloroethylene in the presence of an antimony pentachloride catalyst at temperatures in the range 170° to 195° C., the molar ratio of hydrogen fluoride to trichloroethylene being preferably maintained between about 3:1 to 6:1. Indeed it is disclosed that temperatures of at least 170° C. appear critical and that, with said catalyst, temperatures in excess of 195° C. give little advantage. Reaction times of 16 to 36 hours and molar ratios of trichloroethylene to antimony pentachloride of 25.5:1 to 35.7:1 are disclosed. The highest conversion of trichloroethylene to 1-chloro-2:2:2-trifluoroethane that was obtained was 32% and the yield corresponding to this figure based on trichloroethylene consumed in the process was 43%.

Essentially the same subject matter is disclosed in United States specification No. 2,637,747 for a batch process for the production of 1-chloro-2:2:2-trifluoroethane wherein a claim is made to a process for preparing said trifluoro compound by reacting hydrogen fluoride with trichloroethylene in the presence of antimony pentachloride, the molar quantity of haloalkene exceeding the molar quantity of antimony pentachloride.

According to the present invention a process for the manufacture of 1-chloro-2:2:2-trifluoroethane comprises heating trichloroethylene with hydrogen fluoride at superatmospheric pressure in the presence of at least one mole of an antimony fluochloride catalyst per mole of trichloroethylene.

A molar excess of hydrogen fluoride towards trichloroethylene is preferably employed; desirably at least 3 moles of hydrogen fluoride are employed per mole of trichloroethylene. Generally it is preferred not to use more than 10 moles of hydrogen fluoride per mole of trichloroethylene.

We find that only comparatively low temperatures and pressures are required. In general temperatures of the order of 60° C. to 130° C. and gauge pressures up to 250 lbs. per square inch are satisfactory. Indeed we have obtained good results when using a reaction temperature in the range 80° C. to 90° C. with a gauge pressure of 80 to 90 lb. per square inch.

The fluorine content of the catalyst may be varied over a fairly wide range and good results may be obtained with a fluorine content of 8% to 16%.

The term "antimony fluorochloride catalyst" as used above is intended to include either a mixture of antimony fluorides and chlorides or as the name suggests a fluorochloride, some part of the catalyst containing antimony in the pentavalent state. Such a catalyst can be conveniently made in situ by heating hydrogen fluoride with a mixture in appropriate proportions of antimony trichloride and antimony pentachloride; during this reaction the chlorides are in part converted, as is well known, into the fluoride with elimination of hydrogen chloride. Again the term "antimony fluorochloride catalyst" is also intended to include a catalyst, the antimony content whereof is initially in the fully pentavalent state; such a catalyst is conveniently made in situ by heating hydrogen fluoride with antimony pentachloride. In the initial stages of the process some loss in efficiency of conversion to 1-chloro-2:2:2-trifluoroethane will result until the pentavalent antimony content is reduced to the desired level by reaction with trichloroethylene.

Generally as the ratio of pentavalent antimony to trivalent antimony in the catalyst is increased its activity as a chlorinating agent is increased with the consequent production of increased amounts of chlorofluorinated ethanes containing more than one chlorine atom in the molecule. However, if the ratio of pentavalent antimony to trivalent antimony is reduced to too low a value its activity as a fluorinating agent is decreased. In practice we achieve a compromise by maintaining some part of the antimony in the pentavalent state. As is well known the pentavalent content of an antimony fluorochloride catalyst may be increased by introducing chlorine into the catalyst and we maintain the pentavalent content of the antimony in the catalyst by periodically passing into the reaction mixture just that amount of chlorine which will maintain the pentavalent content of the antimony at the desired level. Generally not more than a total of one mole of chlorine is employed per mole of trichloroethylene. It will be appreciated that as the chlorine is only fed intermittently into the reaction mixture the amount of chlorine relative to trichloroethylene may be above this value at one particular time. However, the molar amount of chlorine over the total reaction period should not exceed the molar equivalent of trichloroethylene. The introduction of chlorine in excess of this total amount, particularly at elevated temperatures will lead to the formation of chlorofluorinated ethanes other than 1-chloro-2:2:2-trifluoroethane and as the amount of chlorine is still further increased say to two molar proportions of chlorine to trichloroethylene, a mixture is produced consisting essentially of trifluorotrichloroethane and tetrafluorodichloroethane.

Solely by way of example, we have obtained good results by maintaining 40% to 60% of the antimony in the catalyst in the pentavalent state when employing a reaction temperature of 80° C. to 90° C. with a gauge pressure of 80 to 90 lb. per square inch, the fluorine content of the catalyst being in the range 8% to 16%.

Although the present process can be carried out in a batchwise manner it is particularly well suited for continuous operation. Thus in one method of carrying out the invention trichloroethylene and hydrogen fluoride are continuously fed into a pressure vessel equipped with a dephlegmator and containing a large excess of a fluorinating agent made from antimony pentachloride and hydrogen fluoride, the reaction mixture being maintained at the appropriate temperature and pressure. The antimony in the pentavalent state is maintained by periodically passing chlorine into the reaction mixture. Some chlorination of trichloroethylene occurs and minor amounts of fluorochlorinated ethanes other than the desired product may be formed as by-product. Dephlegmator conditions may be chosen so that HCl, unreacted HF, and organic material containing the desired 1-chloro-2:2:2-trifluoroethane, together with some by-products, are removed. The desired product is then recovered from the latter mixture.

The product of the invention, namely, 1-chloro-2:2:2-trifluoroethane is useful as a starting material in a process for the production of the valuable inhalation anaesthetic 1-bromo-1-chloro-2:2:2-trifluoroethane described in our British patent specification No. 767,779. The product is also useful as a refrigerant, as a reagent in organic chemistry and as a propellant for aerosols.

The following example illustrates the invention; where parts are mentioned they are by weight.

Example 1

Into a mild steel stirred reactor fitted with a fractionation column and water-cooled dephlegmator was charged 276 parts of antimony pentachloride. The reactor was heated to 80° C. and 48 parts of hydrogen fluoride were added over 12 hours. Throughout this operation the pressure of the system was automatically maintained at a gauge pressure of 85 lbs. per square inch by releasing hydrogen chloride and unreacted hydrogen fluoride. The fluorinating catalyst produced by this operation contained 13.7% $F_2$ and 97% of the total antimony was present as pentavalent antimony.

Hydrogen fluoride and trichloroethylene were then fed into the reactor at average hourly rates of 6 parts and 9 parts respectively. The temperature of the reactor was maintained in the range 80° to 90° C. and the pressure was maintained automatically at 85 lbs. per square inch as above. Because of chlorination reactions the percentage of antimony in the fluorinating agent in the pentavalent state was reduced and periodically chlorine was fed to the reactor to maintain this value between 40% and 60%, the total molar amount of chlorine employed relative to trichloroethylene being 0.45:1. The hydrogen fluoride feed to the reactor was also adjusted from time to time so that the fluorine content of the catalyst was maintained in the range 12–15%. The dephlegmator was held at 30° C. with the result that the vapour leaving the system was a mixture of hydrogen chloride, unreacted hydrogen fluoride and 1-chloro-2:2:2-trifluoroethane along with some organic by-products. These gases were scrubbed with water and with aqueous caustic soda solution to free them from acid and were dried and condensed. 1-chloro-2:2:2-trifluoroethane was recovered from the condensate by fractionation.

By maintaining the dephlegmator at the said temperature a gradual build-up of by-products in the reactor was also permitted. Whenever this amounted to 80–100 parts, the feed to the reactor was stopped and the by-products therein were distilled out. However, it is always possible to operate the process so that substantially all the organic by-products together with HCl, HF and the desired product leave the system via the dephlegmator. After removing acid impurities, drying and condensing, the condensate may be subjected to distillation in an efficient fractionation column to isolate the desired 1-chloro-2:2:2-trifluoroethane from the organic by-products.

There was obtained from 1,937 parts of trichloroethylene and 1,305 parts of hydrogen fluoride a total of 1,062 parts of 1-chloro-2:2:2-trifluoroethane representing a yield of 60.9% of the theoretical on trichloroethylene consumed in the process and 41.2% of the theoretical on hydrogen fluoride consumed in the process.

Example 2

Into a mild steel stirred reactor was charged 450 parts of antimony pentachloride, 342 parts of antimony trichloride and 200 parts of hydrogen fluoride. The reactor was heated to 100° C. and throughout this operation the pressure of the system was maintained at a gauge pressure of 220 lb. per square inch by releasing through a valve hydrogen chloride and unreacted hydrogen fluoride.

The reactor containing the prepared catalyst was then cooled and charged with 394 parts of trichloroethylene and 220 parts of hydrogen fluoride. The reactor was then heated at 95° C. to 105° C. for 2 hours, the pressure being maintained in the manner described above at 220 to 240 lb. per square inch gauge.

From this batchwise method of operation 265 parts of a gaseous product were obtained by distillation from the reactor. This product was found to contain 238.5 parts of 1-chloro-2:2:2-trifluoroethane equivalent to a yield of 67% on trichloroethylene.

What I claim is:

1. A process for the manufacture of 1-chloro-2:2:2-trifluoroethane which comprises heating trichloroethylene with hydrogen fluoride at superatmospheric pressure in the presence of at least one mole of an antimony fluorochloride catalyst per mole of trichloroethylene at a temperature of about 60° to about 130° C. and adding chlorine to the reaction mixture in an amount not greater than one mole of chlorine to each mole of trichloroethylene.

2. A process for the manufacture of 1-chloro-2,2,2-trifluoroethane as set forth in claim 1 in which the reaction is carried out at a pressure not greater than 250 p.s.i.g.

3. A process for the manufacture of 1-chloro-2,2,2-trifluoroethane as set forth in claim 2 in which the reaction is carried out at a pressure between about 80 and about 90 p.s.i.g.

4. A process according to claim 1 in which 3 to 10 moles of hydrogen fluoride are employed per mole of trichloroethylene.

5. A process according to claim 1 in which a reaction temperature of 80° C. to 90° C. is employed.

6. A process for the manufacture of 1-chloro-2,2,2-trifluoroethane as set forth in claim 1 in which the fluorine content of the catalyst is between about 8 and about 16 percent.

7. A process for the manufacture of 1-chloro-2,2,2-trifluoroethane as set forth in claim 1 in which the chlorine is added in an amount of about 0.45 mole for each mole of trichloroethylene.

8. A process for the manufacture of 1-chloro-2,2,2-trifluoroethane which comprises heating a mixture consisting essentially of trichloroethylene and hydrogen fluoride at superatmospheric pressure in the presence of at least one mole of an antimony fluorochloride catalyst per mole of trichloroethylene at a temperature of about 60° to about 130° C. and at superatmospheric pressure.

References Cited in the file of this patent

UNITED STATES PATENTS

| | | |
|---|---|---|
| 2,005,708 | Daudt et al. | June 18, 1935 |
| 2,637,747 | McBee | May 5, 1953 |

OTHER REFERENCES

Henne et al.: Journal American Chemical Society, volume 58, pp. 887–889, June 1936.